United States Patent Office 3,113,977
Patented Dec. 10, 1963

---

3,113,977
REACTION OF METHANE WITH TITANIUM TETRAHALIDE
Walter H. Seitzer, Springfield, Pa., assignor to Sun Oil Company, Philadelphia, Pa., a corporation of New Jersey
No Drawing. Filed Sept. 14, 1960, Ser. No. 55,855
4 Claims. (Cl. 260—659)

This invention relates to the reaction of methane with titanium tetrachloride or tetrabromide to form halomethane and ethane while reducing the titanium to a lower valence state.

Catalyst systems for polymerizing alpha olefins such as ethylene and propylene are known in which $TiCl_3$ or $TiBr_3$ are used in combination with an aluminum trialkyl or alkyl aluminum halide. It is recognized that the activity of the catalyst combination depends to an extent upon the manner in which the titanium trihalide has been prepared.

The present invention provides a means of preparing $TiCl_3$ or $TiBr_3$ in a form which is highly active in the foregoing type of catalyst system. The invention also provides a way for converting methane into chloromethane or bromomethane and ethane.

According to the invention, methane is admixed with $TiCl_4$ or $TiBr_4$ vapor at a temperature in the range of 600–800° C., more preferably 625–700° C. Reactions occur which appear to be according to the following equations, in which it is assumed that $TiCl_4$ is the titanium halide employed:

(1) $2CH_4 + 2TiCl_4 \rightarrow 2HCl + 2TiCl_3 + C_2H_6$
(2) $CH_4 + 2TiCl_4 \rightarrow HCl + 2TiCl_3 + CH_3Cl$ The reaction can be carried out by heating the reactants separately to the reaction temperature and then passing them together through a reaction zone such as a hot tube. It is desirable to quench the reaction mixture rapidly after it has passed through the reactor in order to minimize further conversion which tends to occur by transformation of $TiCl_3$ into $TiCl_2$ and $TiCl_4$. The $TiCl_3$ separates from the reaction mixture in the form of a purple solid and the chloromethane, ethane and HCl can be removed in vapor form from the solid. The $CH_3Cl$, $C_2H_6$ and HCl can then be separated from each other in any suitable manner such as by distillation.

When it is desired to practice the present process for the purpose of producing chloromethane and/or ethane rather than for primarily producing $TiCl_3$ for use as a catalyst, the $TiCl_3$ formed can be converted back to $TiCl_4$ by reaction with HCl at high temperature. For this purpose the HCl formed in the primary reaction can be recovered and reused along with make-up HCl. The resulting $TiCl_4$ can then be recycled in the system.

To demonstrate the operability of the reaction, the following experiment was performed. A sealed glass reactor was provided in its upper part with an electrical resistance coil consisting of 5 feet of #30 Nichrome wire and the reactor was connected to a distillation flask containing $TiCl_4$. The $TiCl_4$ was then distilled into the reactor and condensed therein. Methane was passed into the reactor by means of an inlet line terminating above the $TiCl_4$ and heat was applied to the $TiCl_4$ to effect vaporization. The $TiCl_4$ condensed on the wall of the reactor and flowed back down into the boiling liquid. A current was then passed through the resistance coil. When the wire began to glow, which occurred in the neighborhood of 650° C., the vapors adjacent it became purple indicating the formation of $TiCl_3$. This product collected as a solid on the reactor wall and was washed down by the refluxing $TiCl_4$. Exit gases from the reactor were collected and subsequently tested. Analysis showed that the molar ratio of $CH_3Cl$ to $C_2H_6$ was about 3:2, which indicates that the reaction according to Equation 2 above predominates. The $TiCl_3$ was recovered by distilling off the unreacted $TiCl_4$. The $TiCl_3$ product obtained was particularly useful as a component for a catalyst system of the Ziegler type.

When $TiBr_3$ is used as reactant in place of $TiCl_3$, substantially equivalent results are obtained.

I claim:

1. Method which comprises admixing methane with a titanium tetrahalide selected from the group consisting of $TiCl_4$ and $TiBr_4$ at a temperature in the range of 600–800° C., said titanium tetrahalide being the sole halogen-containing reactant in the mixture, whereby reaction occurs with the formation of halomethane and ethane and the titanium is reduced to a lower valence state.

2. Method according to claim 1 wherein the titanium tetrahalide is $TiCl_4$.

3. Method according to claim 1 wherein the titanium tetrahalide is $TiBr_4$.

4. Method according to claim 1 wherein the temperature is in the range of 625–700° C.

References Cited in the file of this patent

UNITED STATES PATENTS 2,890,100    Davis et al. _____ June 9, 1959

FOREIGN PATENTS 281,094    Germany _____ Dec. 14, 1914
214,293    Great Britain _____ Apr. 14, 1924
487,834    Great Britain _____ June 22, 1938

OTHER REFERENCES

Zapan: Chem. Abstracts, vol. 26, p. 77 (1932).